P. GRABLER.
VALVE MECHANISM.
APPLICATION FILED FEB. 15, 1915.

1,320,465.

Patented Nov. 4, 1919.

Witnesses:
A. L. Lord.
C. H. Shotzbarger.

Inventor.
Peter Grabler
by B. W. Brockett
Att'y.

UNITED STATES PATENT OFFICE.

PETER GRABLER, OF CLEVELAND, OHIO, ASSIGNOR TO THE CLEVELAND FLUSH METER COMPANY, OF CLEVELAND, OHIO, A CORPORATION OF OHIO.

VALVE MECHANISM.

1,320,465.  Specification of Letters Patent.  Patented Nov. 4, 1919.

Application filed February 15, 1915. Serial No. 8,242.

*To all whom it may concern:*

Be it known that I, PETER GRABLER, a citizen of the United States, residing at Cleveland, in the county of Cuyahoga and State of Ohio, have invented certain new and useful Improvements in Valve Mechanism, of which the following is a specification.

This invention relates to improvements in flush valve mechanism and particularly to that class of devices utilized in flushing bowls and the like.

More specifically the invention relates to the packing for the controlling valve member, the object of the invention being to provide a simple and improved packing which more tightly seals the joint when the controlling valve member is manipulated.

Further the invention resides in certain details of construction and combination of parts hereinafter set forth in the following description, drawings and claim.

Figure 1:
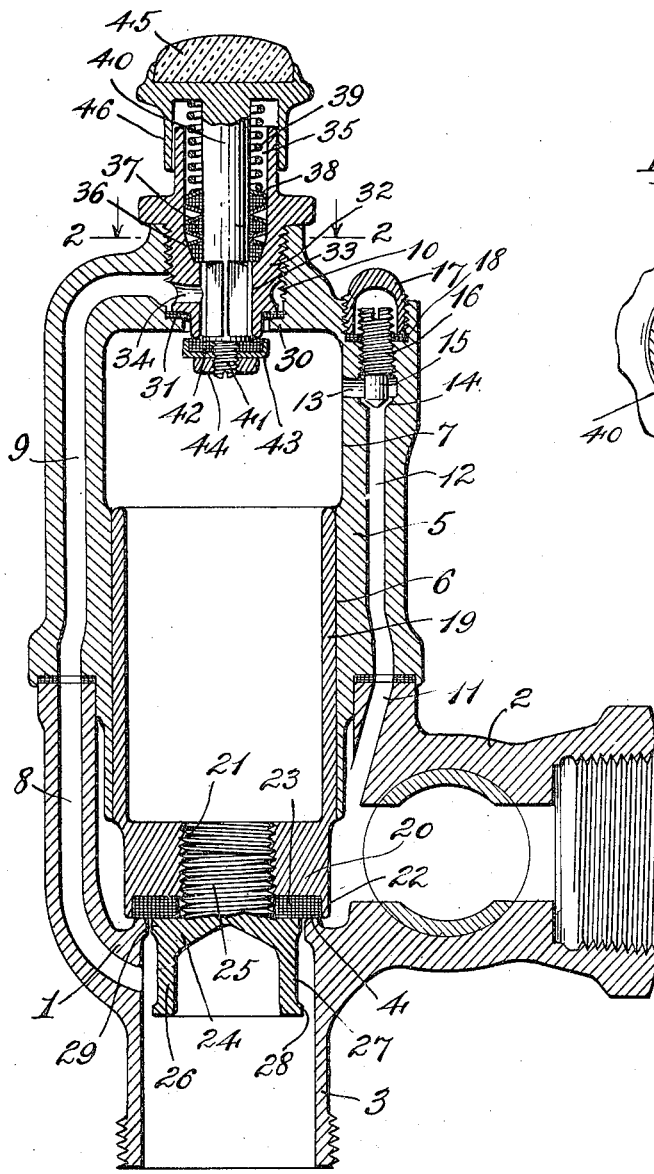
Figure 2:
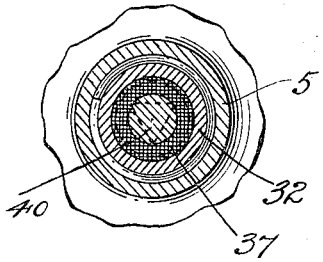

Referring to the drawings, Figure 1 is a vertical sectional view of the device; and Fig. 2 is a section upon the line 2—2 of Fig. 1.

In carrying out the invention any preferred form and construction of parts may be employed so long as they possess the necessary characteristics, but I have shown one form in the drawings which is highly effective in operation, and in such embodiment 1 represents a main casing provided with an inlet connection 2 and a discharge connection 3. Above the discharge opening 3 is a main valve seat 4. Slidably mounted in the upper end of the casing is a cylindrical casing 5 having a bearing surface 6 which is smaller in diameter than the main portion of the casing and having an offset 7 as shown, for a purpose to be described. The lower casing at a point preferably opposed to the inlet is provided with a channel 8 extending from the lower side of the valve seat 4 to and communicating with a channel 9 in the upper cylindrical casing and extending toward the center where it communicates with a threaded opening 10, as shown. The lower casing member 1 is still further provided with a channel 11 leading to the inlet and communicating with a channel 12 extending up and communicating with a port 13 and it coöperates with a bleed valve 15 having a threaded shank 16 engaging in a threaded opening in the casing and adapted for adjustment. A suitable cap 17 is threaded over this valve and engages a suitable packing 18 to prevent leakage at this point.

Within the cylindrical casing is a plunger 19 having a reduced portion 20 provided with a threaded opening 21 and a downwardly extending flange 22 adapted to receive a packing washer 23 arranged to be held in place by a plug 24 having a threaded shank 25 and a downwardly extending cylindrical portion 26 recessed at 27, the remaining annular portions 28 and 29 of this cylindrical portion serving to check the flow of water.

The casing about the lower part of the opening 10 is provided with a shoulder 30 against which a packing 31 is forced by a valve plug 32 having an opening 33 therein communicating with a port 34 which in turn communicates with the channel 9. This opening 33 opens out through the end of the plug and into a larger opening 35 in the plug and having a tapered wall 36, as shown. A suitable packing is arranged in the opening 35 and its tapered portion 36, and it comprises a plurality of packing rings 37 fitting the opening and spaced by washers 38 which are inclined as shown, so that the inner periphery is out of the plane of the outer periphery, whereby when they are arranged one upon the other with the inner peripheries touching, two of them form a separator V-shaped in cross section, which has a tendency to compress the packing toward the valve stem. Bearing against the uppermost washer is a spring 39 which surrounds a cylindrical valve stem 40 extending through the packing sleeve and through the opening 33 to a point below the lower end of the valve plug where it is provided with a threaded shank 41 adapted to receive a suitable valve packing 42 held in place by a valve 43 which in turn is secured in place by a nut 44 upon the threaded shank 41. The valve stem within the opening 33 is triangular, as shown in dotted lines in Fig. 2, a well known construction for permitting the passage of the fluid under pressure around the stem and through the opening 34. The upper end of the valve stem 40 is provided with a push button 45 having a skirt 46 extending around a portion of the plug. When the valve plug is screwed in place against the gasket 31 the valve mechanism is tight, and there is no communication between the channel 9 and the chamber above the plunger, unless the valve is depressed.

The complete operation is as follows. Assuming that water is supplied to the inlet, the operator presses the button 45, causing the valve 43 and its packing 42 to move down away from the lower end of the valve plug, with the result that the pressure above the plunger is relieved through the channels 8 and 9 into the discharge; the increased upward pressure on the plunger causing it to move up quickly, and thereby setting the flush in operation. In the meantime, water is being supplied to the chamber above the plunger through the channel 12 and under the valve 15, but the volume of water supplied at this point is not sufficient to overcome the upward pressure upon the plunger. When the operator releases the button the valve 43 seats against the lower end of the valve plug and the inlet water pressure equalizes above the plunger, permitting it to lower slowly by its own weight until the annular projection 28 carried by the cylindrical portion extending from the valve enters the valve seat and breaks the siphon in the bowl. Thereafter, the annular projection 28 passes the valve seat and refill water flows between the valve seat and the wall of the cylindrical projection at 27 until finally the main valve seats when the device is in normal or closed position.

By the arrangement of the packing with the washers and the spring, it is obvious that when the button 45 is depressed, increased pressure is exerted upon the packing rings causing them to be squeezed in about the valve stem, this being the time when a tight joint is desired, since these parts are then subjected to water pressure.

Having described my invention, I claim:—

A packing for valve operating members, comprising a casing having a substantially cylindrical bore provided with an abutment at one end, a valve stem movable longitudinally within said bore and smaller than the same to provide packing space between the stem and casing, and a packing about said stem comprising a plurality of yielding packing rings, one seated against said abutment, separators arranged between said rings and consisting of oppositely inclined washers adjacent each other, said adjacent washers abutting each other at their central portions and being spaced apart at their outer edges and normally causing each of said rings to individually hug the stem, and means for exerting yielding pressure on the packing.

In testimony whereof I affix my signature in presence of two witnesses as follows.

PETER GRABLER.

Witnesses:
ALTON H. BEMIS,
C. H. SHOTZBARGER.

Copies of this patent may be obtained for five cents each, by addressing the "Commissioner of Patents, Washington, D. C."